(No Model.) 2 Sheets—Sheet 2.
G. S. BINCKLEY.
FRICTION CLUTCH MECHANISM.
No. 596,648. Patented Jan. 4, 1898.
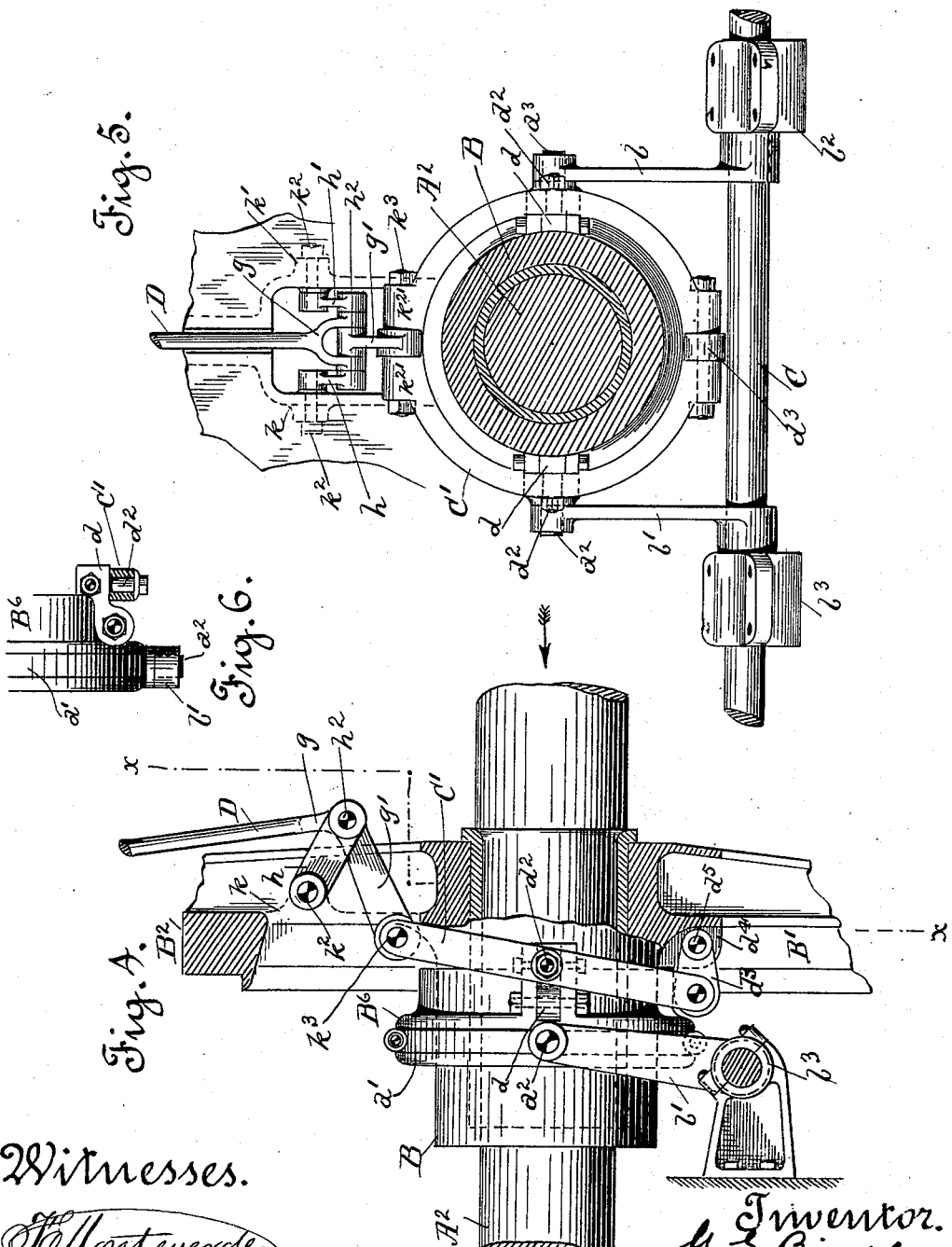
Witnesses.
J. H. Monteverde.
M. G. Loefler.
Inventor.
G. S. Binckley
by N. A. Acker
his atty.

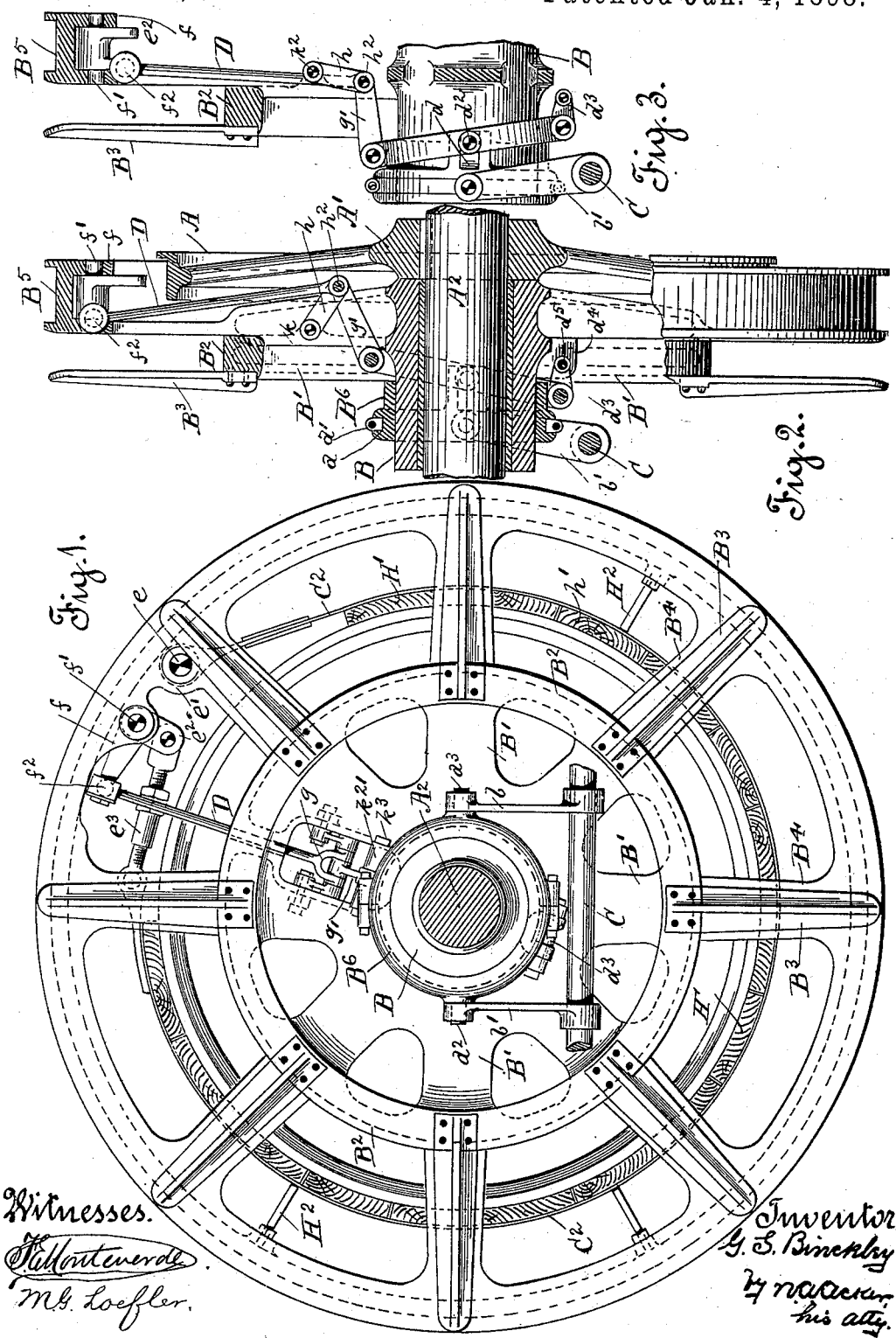

UNITED STATES PATENT OFFICE.

GEORGE S. BINCKLEY, OF SAN FRANCISCO, CALIFORNIA, ASSIGNOR TO THE UNION IRON WORKS, OF SAME PLACE.

FRICTION-CLUTCH MECHANISM.

SPECIFICATION forming part of Letters Patent No. 596,648, dated January 4, 1898.

Application filed January 2, 1897. Serial No. 617,837. (No model.)

*To all whom it may concern:*

Be it known that I, GEORGE S. BINCKLEY, a citizen of the United States, residing at San Francisco, in the county of San Francisco and State of California, have invented certain new and useful Improvements in Friction-Clutch Mechanisms; and I do hereby declare that the following is a full, clear, and exact description thereof.

The present invention relates to certain new and useful improvements in friction-clutch-wheel mechanism for use in connection with hoisting-engines, which consists in the arrangement of parts and details of construction, as will be hereinafter fully set forth in the drawings and described and pointed out in the specification.

The object of the invention is to provide simple and positive mechanism for locking or releasing the winding-reel from locked engagement with the clutch or drive wheel of the hoisting-engine.

In order fully to understand the present invention, reference must be had to the accompanying sheet of drawings, forming a part of this application, wherein—

Figure 1 is a side view in elevation, showing the clutch or drive wheel, the reel, and the clutch-operating mechanism. Fig. 2 is a part vertical sectional view of the mechanism illustrated in Fig. 1, showing the position of the clutch mechanism when released. Fig. 3 is a broken detail sectional view showing the position the parts assume when thrown to lock the winding-reel to the clutch or drive wheel. Fig. 4 is an enlarged partly-broken detail view of the clutch-actuating mechanism. Fig. 5 is a broken vertical sectional front view in elevation on irregular line $x\,x$, Fig. 4, viewed in the direction of the arrow; and Fig. 6 is a detail top plan view of the sliding sleeve, showing connection between said ring and the shifting lever for actuating the clutch mechanism.

The letter A is used to indicate the clutch or drive wheel, the hub A' of which is keyed upon the drive-shaft $A^2$ of the hoisting-engine. To one side of the hub A' is loosely mounted, upon the drive-shaft $A^2$, the hub B, to which hub is connected, by arms B', the cable or reel wheel $B^2$, upon which wheel the cable (not shown) is wound. This cable winds upon the reel or cable wheel $B^2$ between the reel-arms $B^3$, connected to one side or face of said wheel, and the arms $B^4$, projecting outwardly from the hub B, Fig. 2. The arms $B^4$ have connected to their outer ends or are cast with the brake-rim $B^5$, against the surface of which the brake-blocks (not shown) bear.

Upon the hub B works the longitudinally-movable sleeve $B^6$, which is formed with the circular groove $a$, within which is loosely fitted the ring $a'$. This ring is provided with the outwardly-projecting trunnions $a^2\ a^3$, upon which are fitted the upper ends of the levers or arms $b\ b'$. These levers or arms are connected at their lower end to the oscillatory shaft C, which shaft works in bearing-blocks $b^2\ b^3$, secured to the floor or base of the machine.

From the sliding sleeve $B^6$ project the distance or filling pieces $d$, to which is fulcrumed by pins $d^2$ the ring-lever C', which lever is connected below the sleeve $B^6$ to one of the arms B' of the reel or cable wheel by means of the link $d^3$, secured between the depending ears $d^4$ by pin $d^5$.

The clutch or drive wheel A is surrounded by the flexible frictional clutch-band $C^2$, one end of which is connected by pin $e$ between ears $e'$, inwardly projecting from the inner face of the brake-rim, while the free end of said band is connected to the lower arm of the bell-crank lever $e^2$ by means of the adjusting-nut $e^3$. The bell-crank lever $e^2$ is fulcrumed between the ears $f$, depending from the under face of the brake-rim, by means of the pin $f'$. To the upper or free arm of the bell-crank lever $e^2$ is secured, by a ball-joint $f^2$, the upper end of the draw-rod D. The lower end of this rod is bifurcated, as shown at $g$, Fig. 5, so as to straddle the upper end of the link $g'$, and it is secured to said link and between the short arms $h\ h'$ by means of the pin $h^2$. The short arms $h\ h'$ are connected to ears $k\ k'$, projecting from one of the arms of the cable or reel wheel by means of pins $k^2$. The lower end of the link $g'$ is secured between the ears $k^{21}$, projecting from the ring-lever C', by pin or bolt $k^3$.

When it is desired to apply the frictional clutch-band to the clutch or drive wheel, the oscillatory shaft C, which is connected to the shifting mechanism of the hoisting-engine, is rotated so as to throw the upper end of the arms or levers $b$ $b'$ outward. The outward movement of these arms or levers through the medium of the circular ring $a'$, to which they are secured, forces or slides the sleeve $B^6$ outward upon the hub B from the fixed hub $A'$ of the brake-wheel or drive-wheel. As the sleeve slides upon the hub B the upper portion of the fulcrumed lever or ring-lever $C'$ is moved outward. (Position illustrated in Fig. 3 of the drawings.) This movement of the fulcrumed lever draws the rod D downward through the medium of the toggle connection, consisting of the arms or levers $h$ $h'$ and the link $g'$. The rod D being fastened to the upper arm of the bell-crank lever $e^2$, it is obvious that as said rod is drawn downward this arm of the bell-crank lever will be carried therewith and the lower arm be moved upward. This upward movement of the lower arm of the crank-lever draws the friction-clutch band $C^2$ taut and causes the brake shoes or blocks $H'$, secured to the said band, to bear firmly against the periphery of the clutch or drive wheel.

By reversing the movement of the mechanism just described—that is, by giving an opposite rotation or throw to the oscillatory shaft C—the clutch-band will be loosened and forced away from the drive or clutch wheel, so as to release the same. The outward movement of the clutch-band is limited by the stops $H^2$, projecting from the inner surface of the brake-rim $B^5$, which stops serve to support the weight of the clutch-band.

As the brake shoes or blocks become worn by frictional engagement with the clutch or drive wheel the clutch-band is shortened to take up said wear by means of the adjusting-nut $e^3$.

The position of the slide-sleeve, the fulcrumed lever, and the toggle connection between the said lever and the draw-rod when the said rod is forced upward to release the clutch-band is illustrated by Figs. 2 and 4 of the drawings.

Having thus described the invention, what I claim as new, and desire to secure protection in by Letters Patent, is—

1. In combination with the drive-shaft of the clutch-wheel secured thereon, a hub loosely mounted upon said shaft, a reel carried by said hub, a frictional clutch-band interposed between the clutch-wheel and the outer rim of the reel one end of said band being secured to the outer rim of the reel, a bell-crank lever fulcrumed to the reel-rim to one arm of which is connected the other end of said clutch-band, a draw-rod connected at its upper end to the opposite arm of the bell-crank lever, a movable sleeve on said hub, connection between the lower end of the draw-rod and said sleeve whereby the draw-rod is lowered or raised to apply or release the clutch-band as the sleeve is moved forward or backward, and of devices for imparting movement to the sleeve, substantially as described.

2. In a friction-clutch mechanism, the combination of a drive-shaft, a clutch-wheel rigidly secured to said shaft, a loose hub in relation to said shaft, a sleeve movable on said shaft, a lever fulcrumed to distance-pieces connected to said sleeve, a brake-rim surrounding said clutch-wheel, a clutch-band interposed between the clutch-wheel and the brake-rim said band being secured at one end to the brake-rim, a bell-crank lever fulcrumed to said brake-rim to one arm of which the other end of the band is adjustably secured, a draw-rod secured at one end to the other arm of said bell-crank lever by a universal joint, a toggle connection between the other end of the draw-rod and said lever fulcrumed to the movable sleeve, and devices for moving said sleeve.

3. In a friction-clutch mechanism, the combination of a drive-shaft, a clutch-wheel affixed to said shaft, a hub loosely mounted on said shaft, a sleeve slidably mounted on said hub, a lever fulcrumed to said sleeve, a frictional clutch-band supported from said hub and surrounding said clutch-wheel, a draw-rod operatively connected to said clutch-band, and a connection between the draw-rod and said lever whereby upon moving said lever said rod is pulled or drawn to apply the clutch-band to the clutch-wheel.

In testimony whereof I affix my signature, in presence of two witnesses, this 26th day of December, 1896.

GEORGE S. BINCKLEY.

Witnesses:
N. A. ACKER,
LEE D. CRAIG.